April 22, 1930.  A. M. CRAIG  1,755,595
GEAR SHIFTER
Filed April 18, 1928  4 Sheets-Sheet 1
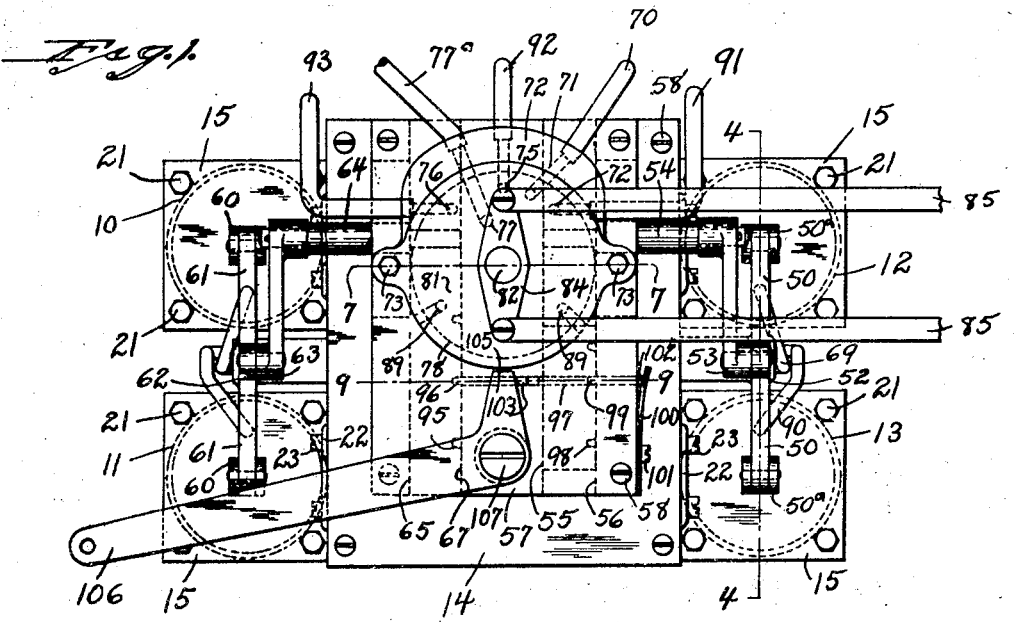
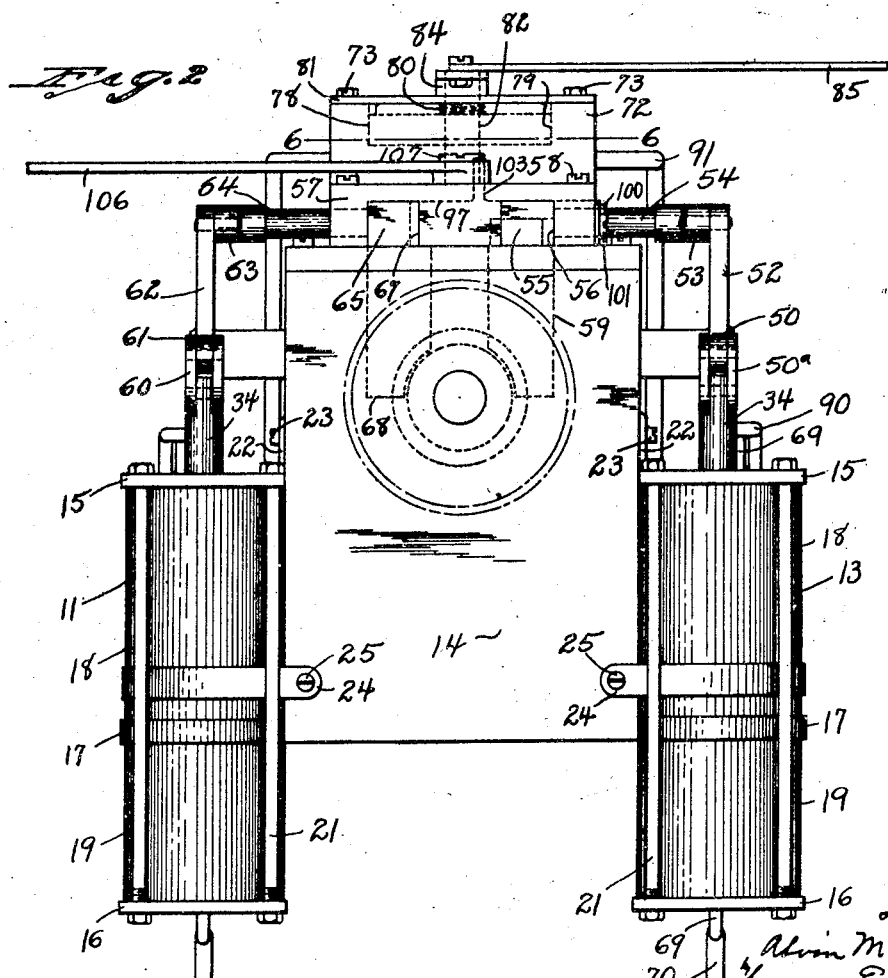

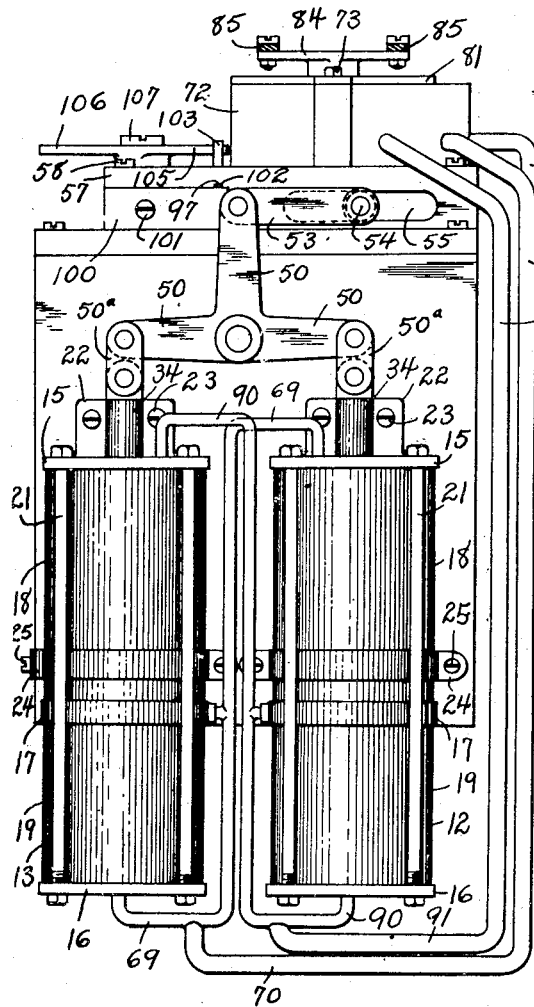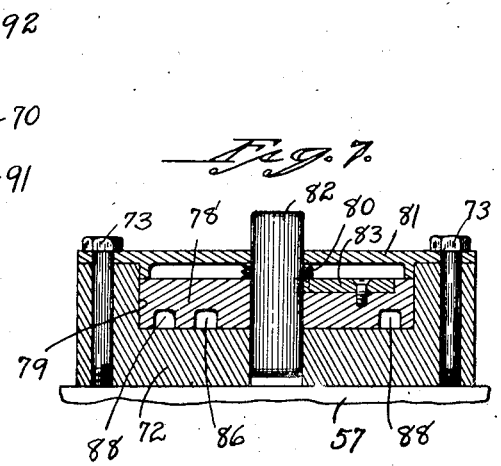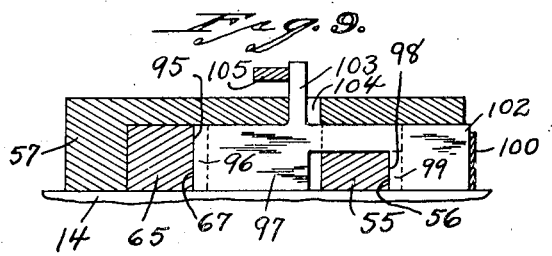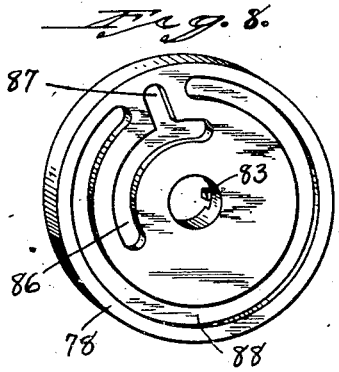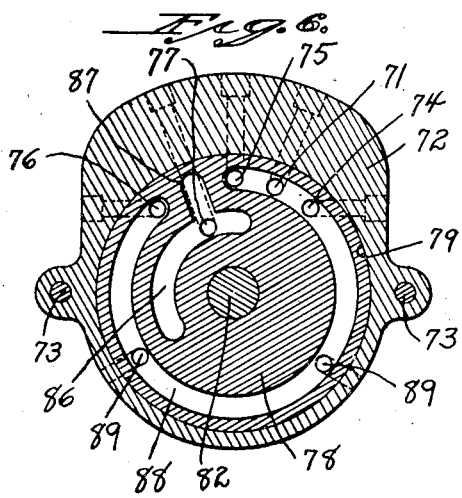

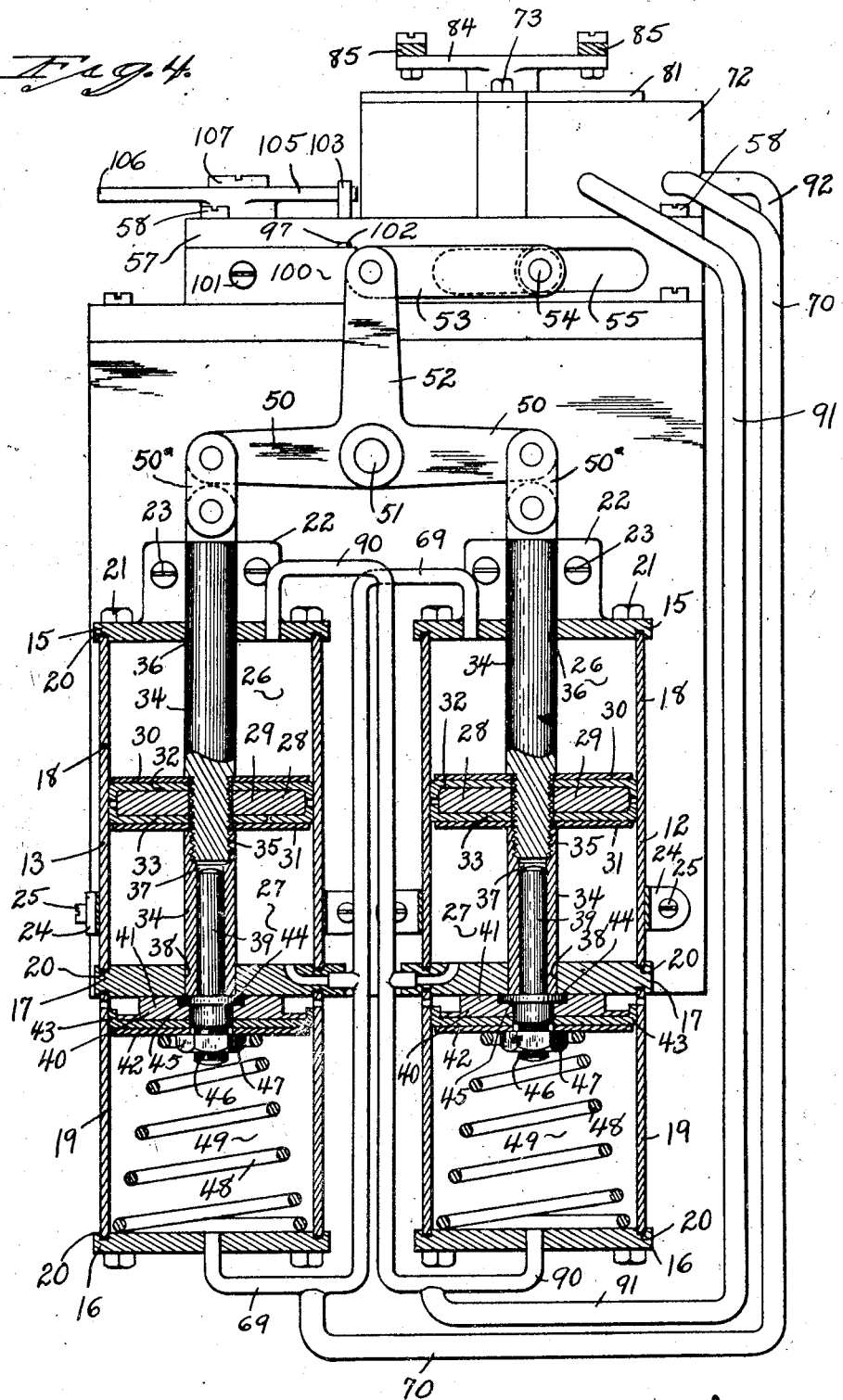

April 22, 1930.  A. M. CRAIG  1,755,595
GEAR SHIFTER
Filed April 18, 1928   4 Sheets-Sheet 4
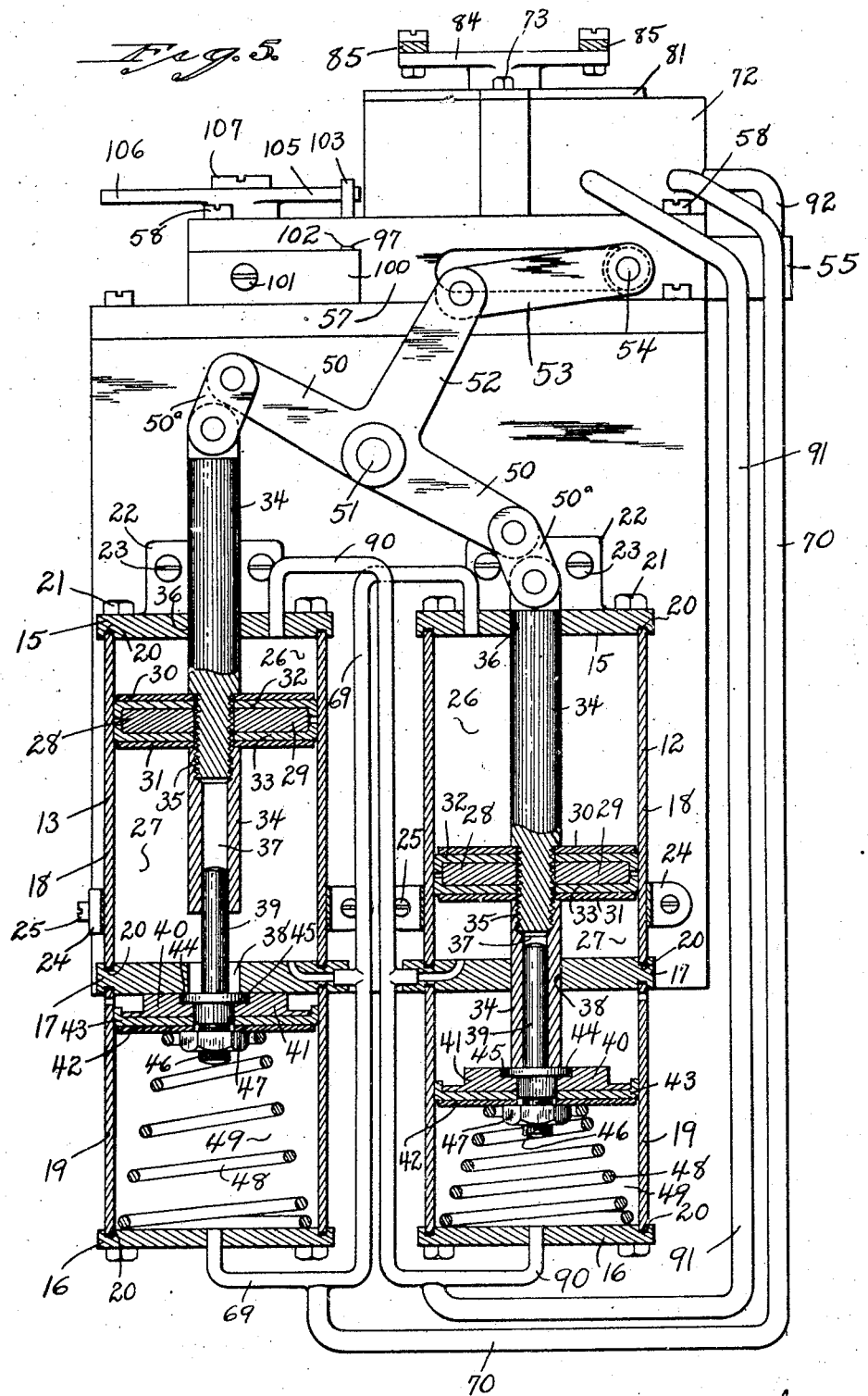

Patented Apr. 22, 1930

1,755,595

UNITED STATES PATENT OFFICE

ALVIN M. CRAIG, OF NEW HAVEN, CONNECTICUT, ASSIGNOR TO AMERICAN GEAR SHIFT COMPANY INC., OF NEW YORK, N. Y., A CORPORATION OF DELAWARE

GEAR SHIFTER

Application filed April 18, 1928. Serial No. 271,089.

My invention relates to improvements in pneumatic gear-shifts for automobiles and the like in which fluid-pressure, usually a vacuum on one side of a piston and air-pressure on the other, is utilized to actuate and shift the gears.

My invention is intended to produce a device which can be preferably actuated by connecting the cylinders with a source of vacuum, preferably the manifold or suction side of an internal-combustion engine.

The object of this invention is to produce a compact and reliable gear-shifter constructed with particular reference to providing ample power for shifting gears under adverse conditions.

Another object of this invention is to produce a gear-shifter so disposed with reference to the transmission-case of an automobile as to require but small accommodation space between the top of the crank-case and the floor of the car, whereby, in most instances, the necessity for cutting away the floor is obviated.

With these and other objects in view, my invention consists in a gear-shifter having certain details of construction as will be hereinafter recited in the claims.

Fig. 1 is a top or plan view of my improved gear-shifter as applied to the transmission-case of an automobile;

Fig. 2 is a view thereof in front elevation;

Fig. 3 is a view thereof in side elevation;

Fig. 4 is an enlarged-scale vertical sectional view on the line 4—4 of Fig. 1;

Fig. 5 is a view corresponding to Fig. 4 but showing the parts in the positions they assume when the gears are being shifted into their third-speed position;

Fig. 6 is a horizontal sectional view on the line 6—6 of Fig. 2;

Fig. 7 is a broken view in vertical section on the line 7—7 of Fig. 1 showing the control-valve and a portion of the crank-case cover;

Fig. 8 is a detached perspective view of the rotary valve-disk detached; and

Fig. 9 is a broken view in vertical section on the line 9—9 of Fig. 1.

In carrying out my invention as herein shown, I employ four corresponding vacuum-cylinders 10, 11, 12 and 13, the former two being located on one side of the transmission or gear-case 14 of an automobile and the two latter cylinders being located on the opposite side thereof, as clearly shown in the drawings.

Each of the cylinders above described corresponds in details of construction, so that a description of one will serve for all. Each cylinder comprises top and bottom plates 15 and 16 respectively, a substantially-central partition-plate 17, an upper cylinder-tube 18 extending between the top-plate and the upper side of the partition-plate 17, and a lower cylinder-tube 19 similarly disposed between the under-side of the said partition-plate and the bottom-plate. The under-side of the top-plate 15, the respective opposite faces of the partition-plate 17 and the upper face of the bottom-plate 16 are each provided with a groove 20 to receive and seat the cylinder-tubes 18 and 19, as shown in the drawings. Four vertical tie-bolts 21 extending between the corners of the top and bottom plates, which are rectangular in form, serve to firmly unite the plates 15, 16, 17, and the cylinder-tubes 18 and 19 into a unitary structure.

For the purpose of attaching the cylinders to the sides of the transmission-case 14, the top-plate 15 of each cylinder is formed with an upstanding-lug 22, through which screws 23 pass into the side-walls of the transmission-case aforesaid. At a point slightly above the partition-plate 17 of each cylinder I apply a strap 24 having offsetting ends which are secured to the crank-case by screws 25 and serve to stabilize the lower portion of each of the cylinders with respect to the transmission-case.

The upper portion of each of the cylinders formed by the cylinder-tubes 18 is virtually divided into two compartments 26 and 27 by a piston generally designated by the numeral 28 and comprising a central-spacing-plate 29, a top retaining-plate 30 and a bottom retaining-plate 31. Clamped between the upper face of the spacing-plate 29 and the clamping-plate 30 I locate a flanged leather washer 32, the flange of which extends downward toward the upturned flange of a complementary washer 33 which is clamped between the under-face of the spacing-plate 29 and the clamping-plate 31 aforesaid.

The said piston 28 is clamped as a unit between the upper and lower parts of a two-part piston-rod 34, the two parts of which are threaded together as shown at 35 in Figs. 4 and 5. The upper end of the piston-rod 34 passes through a central passage 36 in the top-plate 15, while its lower end is provided with a central bore 37 and is adapted to pass through a central passage 38 formed in the partition-plate 17.

Fitting within the bore 37 of the piston-rod 34 is a stem 39 upstanding from a piston 40 located within the cylinder-tube 19 between the partition-plate 17 and the bottom-plate 16. The piston just mentioned comprises a pair of clamping-plates 41 and 42 between which is gripped a flanged leather washer 43, the flange of which is upturned as shown in Figs. 3 and 4. The upper clamping-ring 41 is formed in its upper face with a recess 44 for the reception of an annular flange 45 formed on the stem 39, the lower end of which latter is threaded as at 46 for the reception of a clamping-nut 47 between which and the flange 45 the plates 41 and 42 and the washer 3 are clamped. A conical helical spring 48 impinges at its upper end against the under-face of the piston 40 and at its lower end impinges against the bottom-plate 16 and exerts a constant effort to force the piston 40 upward until its clamping-plate 41 engages with the under-face of the partition-plate 17, and thus yieldingly maintains its piston-rod 34 in its neutral position.

For convenience of description, I shall designate the space enclosed within the cylinder-tube 19 and lying between the piston 42 and the bottom-plate 16 as a suction-chamber 49.

The upper ends of the piston-rods 34 of the complementary cylinders 12 and 13 are connected by means of links 50ª with the oppositely-extending arms 50 of a three-armed lever mounted for oscillation upon a stud 51 offsetting from the side of the transmission-case 14. The said three-armed lever also comprises a vertical arm 52 projecting at a right angle from the arms 50 aforesaid and connected by a link 53 with a stud 54 laterally off-setting from a gear-shifting slide 55 located in a groove 56 formed in the under-face of a rectangular guide-block 57 secured to the upper face of the transmission-case 14 by means of screws 58. The gear-shifting slide 55 is provided with a depending shifter-finger 59 extending downward into the transmission-case 14 and engaging a suitable gear-set. In a similar manner, the piston-rods 34 of the complementary cylinders 10 and 11, which, as before described, are located upon the opposite side of the transmission-case from the cylinders 12 and 13, are connected by means of links 60 with the oppositely-extending arms 61 of a three-armed lever which also comprises a vertical arm 62 connected by means of a link 63 with a stud 64 laterally off-setting from a gear-shifting slide 65 which reciprocates forward and backward in a groove 67 corresponding to the groove 56 before mentioned and formed in the rectangular guide-block 57. Like the slide 55, the slide 56 just mentioned is provided with a depending shifter-finger 68 projecting downward into the transmission-case 14 and engaging one of the usual gear-sets therein.

For convenience of description, it may be assumed that the gear-shifter slide 55 effects the shifting of the appropriate gear-set within the transmission-case 14 into its third-speed position when the said slide is moved rearward, in which position it is shown in Fig. 5 and, further, that the said slide will effect the shifting of the gear-set into its second-speed position when moved to the limit of its forward movement from its neutral position shown in Fig. 4.

Similarly, the gear-shifter slide 65, when moved rearward and forward respectively, will effect the shifting of the gears into their first- and reverse-speed positions.

The suction-chamber 26 of the cylinder 12 is connected by a pipe 69 with the suction-chambers 27 and 49 of the cylinder 13 and all three of the said suction-chambers are connected by a pipe 70 jointed into the said pipe 69, to a second-speed port 71 extending through the bottom-wall of a control-valve casing 72 secured to the upper face of the guide-block 57 already described, by screws 73. The said casing also has extending through its bottom-wall a third-speed port 74, a first-speed port 75, a reverse-speed port 76 and a main suction-port 77, which latter is connected by a pipe 77ª to the intake-manifold of the engine or other suitable source of vacuum. Co-acting with the said ports 71, 74, 75, 76 and 77 is a rotary valve-disk 78 located in a pocket 79 in the upper face of the valve-casing 72 and maintained at the bottom of the said pocket by a helical spring 80 bearing against the upper face of the valve-disk and against the under-side of a cover-plate 81. The said valve-disk is provided with a short vertical stub-shaft 82 coupled to it by means of a key-plate 83 and provided with a two-armed lever 84 receiving at its respective opposite ends a pair of actuating-links 85 leading to any convenient point from which it is desired to operate the valve-disk.

The under-face of the valve-disk 78 just described is formed with a main-suction channel comprising an arcuate arm 86 arranged in line with the main suction-port 77 and a radial arm 87 extending outward so as to connect any given one of the ports 71, 74, 75 and 76 to the main suction-port 77 when the said arm 87 is moved into line with any one of them. The said valve-disk is also formed in its under-face with a concentric relief-channel 88 which is adapted to admit atmospheric air into any three of the four ports 71, 74, 75 and 76 when the fourth port is connected to the main suction-port 77. To admit atmospheric air into the channel 88 the valve-casing 72 is also formed with two air-ports 89 registering with the said channel and leading to the atmosphere.

The suction-chamber 26 of the cylinder 13 is connected by a pipe 90 with the suction-chambers 27 and 49 of the cylinder 12 and all three of the said suction-chambers are connected by a pipe 91 joined into the pipe 90 just mentioned and leading to the third-speed port 74 in the valve-casing 72.

I have described in detail the interconnections between the various suction-compartments of the cylinders 12 and 13 located on one side of the transmission-case which are intended to operate the gear-set within the same into second- and third-speed positions. It will be understood that the cylinders 10 and 11 are interconnected in the same way as the cylinders 12 and 13 and are connected by pipes 92 and 93 to the first-speed port 75 and the reverse speed-port 76 respectively.

For the purpose of locking the gear-shifting slides 55 and 65 in any one of the three positions which they each may assume, I form three corresponding locking-notches 95 in one edge of the slide 65, each of which, in turn, is adapted to receive the slightly-tapered end 96 of a locking-bar 97 transversely mounted for reciprocation in the guide-block 57 before mentioned. The gear-shifting slide 55 is formed also in one edge with three corresponding locking-notches 98 receiving, in turn, a locking-tooth 99 formed on the locking-bar 97 aforesaid. The parts 96 and 99 of the locking-bar 97 are urged into engagement with the locking-notches 95 and 98 respectively by a flat spring 100 secured to the side of the guide-block 57 by a screw 101 and bearing against the outer end 102 of the said locking-bar. To provide for retracting the locking-bar 97 against the counter-urge of the spring 100, it is formed with an upstanding-finger 103 projecting outward through a slot 104 in the top of the guide-block 57, where it is engaged by the arm 105 of an unlocking-lever 106 pivoted upon a stud 107 and operated in any convenient manner, such as by connecting it to the clutch-pedal of the automobile.

The operation of my improved gear-shifter is as follows:

Let it be supposed that the operator desires to shift the gears within the transmission-case 14 to their second-speed position. With this end in view, he will operate the links 85 from any convenient point and turn the valve-disk 78 so as to register its reach 87 with the second-speed port 71, thus connecting the latter to the main suction-port 77 and suction-pipe 77ᵃ. When this has been effected, suction will be created through the pipes 69 and 70, in the suction-chamber 26 of the cylinder 12, and also in the suction-chambers 27 and 49 of the cylinders 13. Now, when the unlocking-lever 106 is operated to retract the tooth 99 of the locking-bar 97 from the particular one of the notches 95 in which it happens to be at the time, the suction created as just described will act with the effect of drawing the pistons 28 and 40 of the cylinder 13 downward and the piston 28 of the cylinder 12 upward, so as to compress the spring 48 in the suction-chamber 49 of the cylinder 13 and move both of the piston-rods 34 of the cylinders 12 and 13 so as to rock the three-armed lever by which they are connected and move the gear-shifting slide 55, together with its depending-finger 59 and the appropriate gear-set, into second-speed position, where it is locked by the entry of the tooth 99 of the locking-slide 97 into one of the locking-notches 98 in the said slide. At the time the slide 55 is unlocked, as above described, the slide 65 will also be unlocked so as to permit the springs 48 within its actuating cylinders 10 and 11 to move it to its neutral position, if it is not already in that position.

While the reach 87 is in registration with the second-speed port 71 to operate the pistons as just above described, the ports 74, 75 and 76 are connected to the atmosphere by means of the channel 88 and ports 89.

As soon as the slide 55 has been unlocked and the valve-disk 78 has been turned so as to move the channel-reach 87 out of registration with the second-speed port 71, the spring 48 in the cylinder 13, which has been compressed, will assert itself and move the piston 40 and piston-rod 34 of the said cylinder upward into its neutral position, at which time the two springs 48 in both of the said cylinders 12 and 13 maintain the parts in their neutral position, as shown in Fig. 4.

When it is desired to shift the gears into third-speed position, the reach 87 of the main-suction channel in the valve-disk 78 is moved into registration with the third-speed port 74 and thus creates suction through the pipes 91 and 90 in the suction-compartments 26 of the cylinder 13 and also in the suction-compartments 27 and 49 of the cylinder 12. Now, when the shifting-slide 55 has been unlocked by the lever 106, the suction created as just described will act with the effect of drawing downward upon the pistons 28 and 40 of the cylinder 12 and upward upon the piston 28 of the cylinder 13, so as to move the parts from the neutral position in which they are shown in Fig. 4, to the third-speed position in which they are shown in Fig. 5, in which position the slide 55 is locked by the entry of the tooth 99 of the locking-bar into one of the locking-notches 98 in the said slide. As soon as the slide 55 has been again unlocked and the reach 87 of the main suction-channel in the valve-disk is moved out of registration with the third-speed port 71, the spring 48 of the cylinder 12 will assert itself and move the parts back into the neutral position shown in Fig. 4.

From the foregoing, it will be seen that the cylinders work in pairs, the suction-compartment 26 in the cylinder 12 acting with and assisting the suction-compartments 27 and 49 of the cylinder 13 to shift the gears into second-speed position and, on the other hand, the suction-compartment 26 of the cylinder 13 acting with and assisting the suction-compartments 27 and 49 of the cylinder 12 to move the gears into their third-speed position.

The cylinders 10 and 11 on the opposite side of the transmission-case 14 act in exactly the same manner to effect the shifting of the gears into their first-speed and reverse-speed positions and require no detailed description of operation or parts.

As above described, the gear-shifter is operated by creating a vacuum on one side of its pistons and thus permitting atmospheric air-pressure to move the said pistons. It is obvious that if desired compressed-air or other fluid medium under pressure may be utilized, instead of relying on atmospheric air-pressure.

I claim:

1. In a gear-shifter, the combination with the transmission-case of an automobile; of a substantially vertically-arranged cylinder positioned at the side thereof; a vertically-reciprocating piston and piston-rod in the said cylinder; a gear-shifting member reaching into the said transmission-case; and motion-converting connections extending laterally of the said transmission-case for coupling the said piston-rod with the said gear-shifting member and converting the substantially-vertical movement of the former into a movement of the latter longitudinal to the transmission-case.

2. In a gear-shifter, the combination with the transmission-case of an automobile; of a pair of complementary substantially vertically-arranged cylinders positioned at the side thereof; a vertically-reciprocating piston and piston-rod for each of the said cylinders; a gear-shifting member reaching into the said transmission-case; and motion-converting connections extending laterally of the said transmission-case for coupling the piston-rods of both of said cylinders with the said gear-shifting member and converting the substantially-vertical movement of the former into a movement of the latter longitudinal to the transmission-case.

3. In a gear-shifter, the combination with the transmission-case of an automobile; of a pair of complementary cylinders positioned at the side thereof; a piston and piston-rod for each of the said cylinders; a three-armed lever for coupling the piston-rods of the respective cylinders together; a gear-shifting member reaching into the said transmission-case; and connecting-means for connecting the said three-armed lever with the said gear-shifting member.

4. In a gear-shifter, the combination with the transmission-case of an automobile; of two pair of complementary cylinders respectively positioned on each of the opposite sides thereof; a piston and piston-rod for each of the said cylinders; coupling-means for coupling the piston-rods of each pair of cylinders together; two gear-shifting members reaching into the said transmission case; and connecting-means connecting the coupling-means of each pair of cylinders with one of the said gear-shifting members.

5. In a gear-shifter, the combination with the transmission-case of an automobile; of two pair of complementary cylinders respectively positioned on each of the opposite sides thereof; a piston and piston-rod for each of the said cylinders; a three-armed lever for coupling the piston-rods of each pair of cylinders together; two gear-shifting members reaching into the said transmission-case; and connecting-means respectively connecting the said three-armed levers with the said gear-shifting members.

6. In a gear-shifter, the combination with the transmission-case of an automobile; of a substantially vertically-arranged cylinder positioned at the side thereof; a vertically-reciprocating piston and piston-rod in the said cylinder; a gear-shifting slide reciprocatable longitudinally of the transmission-case and having a gear-operating finger projecting thereinto; and motion converting connecting-means for coupling the said piston-rod with the said gear-shifting slide and converting the substantially-vertical movement of the former into a movement of the latter longitudinal to the transmission-case.

7. In a gear-shifter, the combination with the transmission-case of an automobile; of a pair of complementary vertically arranged cylinders positioned at the side thereof; a vertically-reciprocating piston and piston-rod for each of the said cylinders; a gear-shifting slide reciprocatable longitudinally of the transmission-case and having a gear-operating finger reaching thereinto; and motion-converting connecting-means for connecting the respective piston-rods of both cylinders to the said slide and converting the substantially-vertical movement of the former into a movement of the latter longitudinal to the transmission-case.

8. In a gear-shifter, the combination with the transmission-case of an automobile; of a pair of complementary cylinders positioned at the side thereof; a piston and piston-rod for each of the said cylinders; a gear-shifting slide having a gear-operating finger reaching into the said transmission-case; a three-armed lever coupling the respective piston-rods of both cylinders together; and connections between the said lever and slide.

9. In a gear-shifter, the combination with the transmission-case of an automobile; of two pair of complementary cylinders respectively positioned on each of the opposite sides thereof; a piston and piston-rod for each of the said cylinders; coupling-means for coupling the piston-rods of each pair of cylinders together; two gear-shifting slides each having a gear-operating finger projecting into the said transmission-case; and connecting-means connecting the coupling-means of each pair of cylinders to one of the said slides.

10. A gear-shifter comprising a pair of complementary cylinders each having a plurality of air compartments; a piston and piston-rod for each cylinder; means for connecting the piston-rods of both cylinders together; and valveless direct-communicating air-ducts connecting an air-chamber of one cylinder to the opposite air-chamber of the complementary cylinder in such manner as to cause both cylinders to act together to move the said piston-rods concurrently.

11. A gear-shifter comprising a cylinder having a fixed transverse partition-wall dividing the same into two air-chambers, a piston on each of the opposite sides of the said partition, and air-ducts connecting the said chambers together; whereby both of said pistons are caused to move concurrently in the same direction.

12. A gear-shifter, comprising a gear-shifting member; a pair of complementary cylinders each having a plurality of air-compartments; a piston and piston-rod for each cylinder; means for connecting the piston-rods of both cylinders to the said gear-shifting member; and valveless direct-communicating air-ducts connecting an air-chamber of one cylinder to the opposite air-chamber of the complementary cylinder in such manner as to cause both cylinders to act together to move the said piston-rods concurrently.

13. A gear-shifter, comprising a gear-shifting member; a pair of complementary cylinders each having three air-chambers; a piston-rod and two pistons for each cylinder; means connecting the piston-rods of both cylinders to the said gear-shifting member; and air-ducts connecting two air-chambers of each cylinder to the third air-chamber of the complementary cylinder in such manner as to cause the two air-chambers in one cylinder to act with and assist the third air-chamber in the complementary cylinder to effect the movement of the said gear-shifting member.

14. A gear-shifter, comprising a gear-shifting member; a pair of complementary cylinders each having three air-chambers; a piston-rod and two pistons for each cylinder; means connecting the piston-rods of both cylinders to the said gear-shifting member; and air-ducts connecting two air-chambers of each cylinder to the third air-chamber of the complementary cylinder in such manner as to cause the two air-chambers in one cylinder to act with and assist the third air-chamber in the complementary cylinder to effect the movement of the said gear-shifting member.

15. A gear-shifter, comprising a gear-shifting member; a pair of opposed springs normally tending to move the said gear-shifting member into a neutral position; a pair of complementary cylinders each having three air-chambers; a piston-rod and two pistons for each cylinder; means connecting the piston-rods of both cylinders together; and air-ducts connecting two air-chambers of each cylinder to the third air-chamber of the complementary cylinder and in such manner as to cause the two air-chambers in one cylinder to act with and assist the third air-chamber in the complementary cylinder to effect the movement of the said gear-shifting member.

16. In a gear-shifter, the combination with the transmission-case of an automobile; of a pair of complementary cylinders positioned at the side thereof; a piston and piston-rod for each of the said cylinders; a gear-shifting slide having a gear-operating finger reaching into the said transmission-case; a pair of opposed springs normally tending to move the said gear-shifting slide into a neutral position; a three-armed lever coupling the respective piston-rods of both cylinders together; and connections between the said lever and slide.

In testimony whereof, I have signed this specification.

ALVIN M. CRAIG.